United States Patent [19]
Morita

[11] Patent Number: 5,319,799
[45] Date of Patent: Jun. 7, 1994

[54] SIGNAL OSCILLATION METHOD FOR TIME-DIVISION DUPLEX RADIO TRANSCEIVER AND APPARATUS USING THE SAME

[75] Inventor: Naoya Morita, Yamato, Japan

[73] Assignee: Matsushita Electric Industrial Co., Ltd., Osaka, Japan

[21] Appl. No.: 818,124

[22] Filed: Jan. 8, 1992

[30] Foreign Application Priority Data

Jan. 25, 1991 [JP] Japan ................................. 3-7601

[51] Int. Cl.$^5$ ............................................. H04B 1/44
[52] U.S. Cl. ........................................ 455/78; 455/75; 455/86; 370/32
[58] Field of Search ................................. 455/75–76, 455/78, 83–87, 112; 370/24, 29, 32

[56] References Cited

U.S. PATENT DOCUMENTS

| | | |
|---|---|---|
| 3,324,396 | 6/1967 | Schneider . |
| 4,027,242 | 5/1977 | Yamanaka . |
| 4,061,973 | 12/1977 | Reimers et al. . |
| 4,186,343 | 1/1980 | Kakigi ................................. 455/76 |
| 4,510,595 | 4/1985 | Glance et al. . |
| 4,627,099 | 12/1986 | Shimakata ........................... 455/76 |
| 4,864,634 | 9/1989 | Nakagawa et al. . |
| 4,903,257 | 2/1990 | Takeda et al. ...................... 370/29 |
| 5,123,008 | 6/1992 | Beesley ............................... 370/29 |

FOREIGN PATENT DOCUMENTS 1596302 8/1981 United Kingdom .
2188212 9/1987 United Kingdom .

Primary Examiner—Reinhard J. Eisenzopf
Assistant Examiner—Chi Pham
Attorney, Agent, or Firm—Stevens, Davis, Miller & Mosher

[57] ABSTRACT

A time-division duplex radio transceiver is disclosed which can avoid the deterioration of reception sensitivity and interferences in other radio communication equipments of the same kind which may be caused in the conventional transceiver by generation in the transceiver of an interfering signal of a transmission frequency or a frequency in the vicinity thereof, even upon reception. In the time-division duplex radio transceiver according to the present invention, in order to generate a carrier frequency signal in the transmission state or an intermediate frequency in a transceiver portion, there are provided an oscillator for oscillation at a frequency higher than the carrier frequency and the intermediate frequency, and frequency dividers for frequency-dividing an output of the oscillator, where the operation of the frequency dividers is stopped in the reception state. Accordingly, while the oscillation of the oscillator is always continued, it is possible to prevent the transmission frequency or the frequency in the vicinity thereof from being generated in the transceiver in the reception state.

21 Claims, 3 Drawing Sheets

SIGNAL OSCILLATION METHOD FOR TIME-DIVISION DUPLEX RADIO TRANSCEIVER AND APPARATUS USING THE SAME

BACKGROUND OF THE INVENTION

The present invention relates to a radio transceiver for providing duplex radio communication by alternately transmitting and receiving on a time division basis by use of the same frequency.

Such a method of alternate transmission and reception in a time division fashion is called a time-division duplex (TDD) system or a pingpong system. This system has advantages that restrictions imposed on frequency allotment are lessened since the same frequency is used for both transmission and reception and that high control efficiency is obtained since all interferences between transmission and reception can be monitored even in the case where dynamic channel selection is made.

In a two-frequency duplex system, which is usually used for duplex radio communication, the transmission frequency and the reception frequency of one of opposing radio stations has a reverse relation with respect to the transmission frequency and the reception frequency of the other radio station. Therefore, two kinds of equipments are required and a parent and child relation results between the two kinds of equipments. On the other hand, the TDD system is an excellent system in which the same construction can be used in both of opposing radio equipments and communication between child equipments is also possible. Further, since the transmission frequency and the reception frequency are the same, the TDD system has an advantage that even when one equipment is not provided with a diversity circuit, a pseudo diversity effect can be expected if the other equipment is provided with two antennae and makes transmission by use of one of the two antennae which exhibits a better characteristic in a reception state.

Furthermore, the TDD system is applicable not only to duplex operation by the time division multiplexing of a single radio-wave channel, but also to time-division multiple-access (TDMA) communication in which a plurality of communications are made on the time division basis. The optimization of the TDD system for use for digital codeless telephone sets in offices having a large amount of traffic can be realized as a TDMA/TDD system by arranging the transmission and reception timings alternately with a modulation rate twice as high as that in the two-frequency duplex system.

However, when a transceiver is actually fabricated in accordance with the TDD system, expected performance often cannot be sufficiently attained due to various limitations inherent in the TDD system. One of the essential problems lies in the fact that it is very difficult to completely cut a transmission wave when transmission is to be stopped in the reception state. This is because if an oscillator, such as a quartz crystal or a synthesizer is once stopped, it takes time before it will stably oscillate again and hence it is hard to catch up with the timing of time-division transmission/reception in a high-speed pingpong system. In the conventional TDD system, therefore, the oscillation at the transmission frequency or a frequency in the vicinity is maintained in the transceiver in the reception state, and deterioration of reception sensitivity due to the transmission wave is prevented by cutting off a power source for a part of circuit or shielding the same. However, the countermeasure such as shielding has limitations in its performance. Also, if the frequency of the oscillator is shifted to an adjacent channel in the reception state to prevent the deterioration of reception sensitivity, there is a problem of causing interference in other transceivers or equipments of the same kind making communications in the neighborhood.

SUMMARY OF THE INVENTION

An object of the present invention made to solve the above problems in the conventional art is to provide a time-division duplex radio transceiver which satisfactorily exhibits the inherent performance of a TDD system without stopping an oscillator.

Another object of the present invention is to avoid the deterioration of reception sensitivity and the interference in other communication equipments which may be caused by the generation of a radio wave at a transmission frequency or a frequency in the vicinity when the tranceiver is in its reception state.

A further object of the present invention is to provide a time-division duplex radio transceiver in which a receiver portion includes at least one stage of superheterodyne converter.

A still further object of the present invention is to provide a time-division duplex radio transceiver which is capable of providing communication through a frequency change-over in a plurality of carrier frequencies.

To that end, according to one aspect of the present invention, a signal at a transmission frequency to be emitted in the transmission state is generated by an oscillator oscillating at a frequency higher than the transmission frequency, an output of the oscillator being frequency-divided by frequency divider means, and in the reception state, an operation of the frequency divider means is stopped or a change-over to another frequency divider means is made, to thereby to prevent the radio wave at the transmission frequency from being generated in the transceiver.

According to another aspect of the present invention, in order to generate a signal at a transmission frequency to be emitted in the transmission state or at an intermediate frequency for an intermediate stage of a transmitter portion, there are provided an oscillator oscillating at a frequency higher than the transmission frequency or the intermediate frequency and frequency divider means for frequency-dividing an output of the oscillator, and in the reseption state, an operation of the frequency divider means is stopped or a change-over to another frequency divider means is made, to thereby to prevent the signal at the transmission frequency or the intermediate frequency from being generated in the transceiver.

According to a further aspect of the present invention, a receiver portion includes at least one stage of superheterodyne frequency conversion. In order to selectively generate a signal at a transmission frequency to be emitted in the transmission state or at a local oscillation frequency of the superheterodyne frequency converter in the receiver portion, there are provided an oscillator oscillating at a frequency higher than the transmission frequency or the local oscillation frequency and a frequency divider which frequency-divides an output of the oscillator. The output of the oscillator is frequency-divided at different division ratios for the transmission and reception states, respectively, through a change-over therebetween, thereby obtaining the signal at the transmission frequency or the local oscillation frequency.

There may be provided a second oscillator oscillating at a local oscillation frequency for converting the intermediate frequency in the transmission state into the carrier signal at the transmission frequency higher than that and converting a signal at a reception frequency in the reception state into an intermediate frequency lower than that.

DESCRIPTION OF THE PREFERRED EMBODIMENTS

Figure 1:
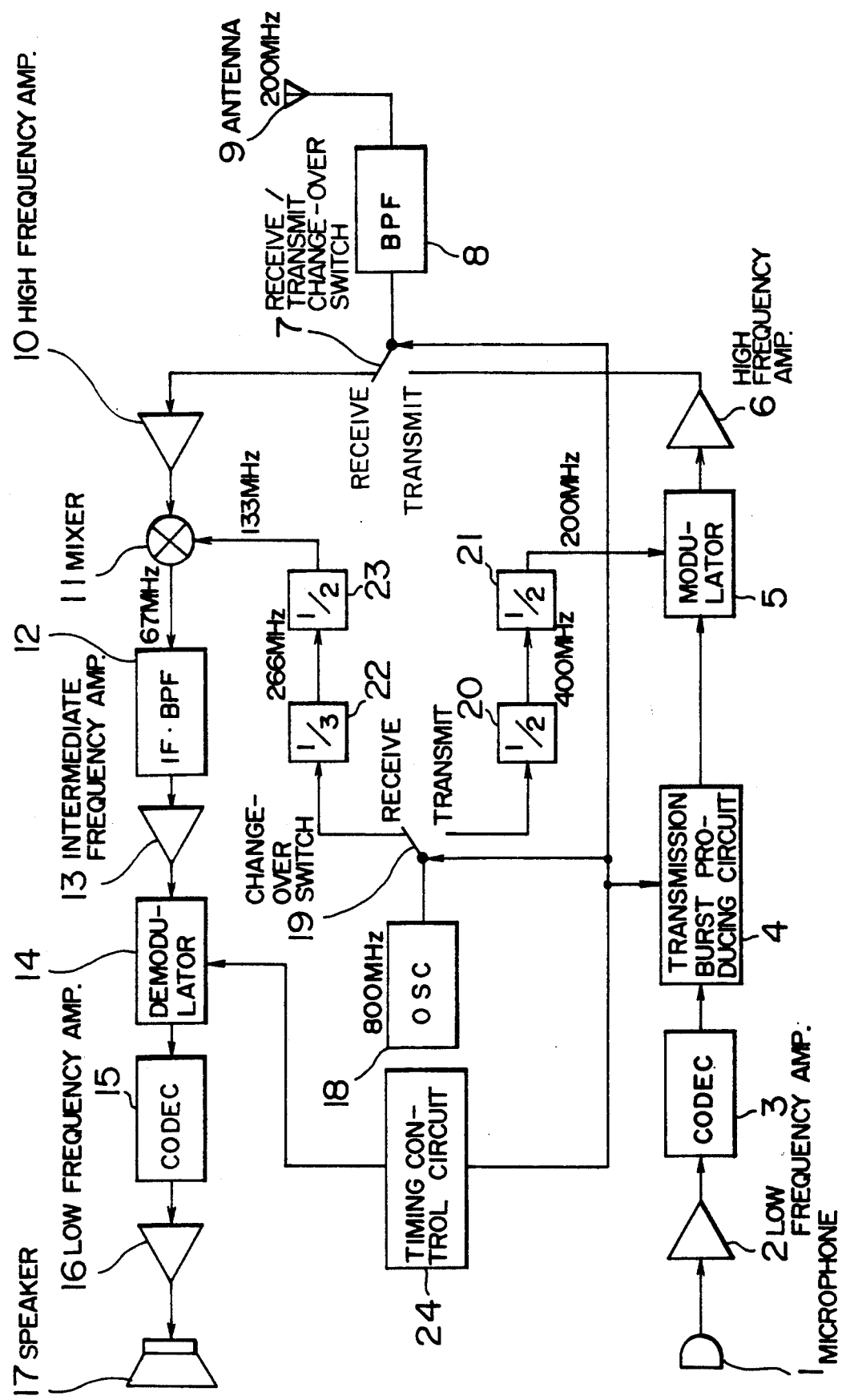
FIG. 1 is a block diagram of a radio transceiver according to a first embodiment of the present invention.

FIG. 1 shows the construction of a first embodiment of the present invention or a block diagram of a TDD radio transceiver which makes transmission/reception in the 200 MHz band. The transceiver of the first embodiment includes an superheterodyne receiver portion which works at an intermediate frequency of 67 MHz and a transmitter portion which directly modulates a carrier at 200 MHz.

In FIG. 1, reference numeral 1 designates a microphone, numeral 2 a low frequency amplifier, numeral 3 a CODEC, numeral 4 a transmission burst producing circuit, numeral 5 a modulator, numeral 6 an amplifier, numeral 7 a transmit/receive change-over switch, numeral 8 a band pass filter (BPF) and numeral 9 an antenna; these components form a transmitter portion. On the other hand, reference numeral 10 designates a high frequency amplifier, numeral 11 a mixer, numeral 12 an intermediate frequency band pass filter (IF-BPF), numeral 13 an intermediate frequency amplifier, numeral 14 a demodulator, numeral 15 a CODEC, numeral 16 a low frequency amplifier and numeral 17 a speaker; these components form a receiver portion, together with the transmit/receive change-over switch 7, the band pass filter 8 and the antenna 9. Also, reference numeral 18 designates an oscillator of a frequency in a UHF band, for example, 800 MHz, numeral 19 a change-over switch, numerals 20 and 21 ½ frequency dividers, numeral 22 a ⅓ frequency divider, numeral 23 a ½ frequency divider and numeral 24 a timing control circuit; these components form a characterized part of the present embodiment. The timing control circuit 24 controls the timing of the operation for the transmission burst producing circuit 4 and the demodulator 14 and also controls the timing of change-over for the transmit/receive change-over switch 7 and the change-over switch 19.

Next, explanation will be made of the operation of the first embodiment. An audio signal from the microphone 1 is amplified by the low frequency amplifier 2, is thereafter converted by the CODEC 3 into a digital signal and is then inputted through the transmission burst producing circuit 4 to the modulator 5. Thereupon, an output of the oscillator 18, of 800 MHz which is converted into 200 MHz after passing through two stages of the ½ frequency dividers 20 and 21 with the change-over switch 19 turned to the transmit side, is applied to the modulator 5 as a carrier signal to be emitted in the transmission state. A high frequency signal obtained by modulating this carrier signal of 200 MHz is amplified by the amplifier 6, is thereafter sent to the antenna 9 with the transmit/receive change-over switch 7 turned to the transmit side and is passed through the band pass filter 8 and is emitted as a radio wave from the antenna 9.

On the other hand, in the reception state, a 200 MHz signal received by the antenna 9 is inputted to the mixer 11 through the band pass filter 8, with the transmit/receive change-over switch 7 turned to the receive side and through the high frequency amplifier 10. At the time of reception, the output of the oscillator 18 of 800 MHz is supplied to the receive side through the change-over switch 19 and is passed through the ⅓ frequency divider 22 and the ½ frequency divider 23. Therefore, a signal of 133 MHz, which is one sixth of the original oscillation frequency, is injected to the mixer 11 as a local frequency signal for a superheterodyne. As a result, the signal is frequency-converted by the mixer 11 into 67 MHz as an intermediate frequency in the receiver portion. The frequency-converted signal is send to the CODEC 15 through the intermediate frequency band pass filter 12, the intermediate frequency amplifier 13 and the demodulator 14, and is returned to an audio signal by the CODEC 15. The audio signal is amplified by the low frequency amplifier 16 and is thereafter outputted from the speaker 17. During the above operation in the reception state, each of the change-over switch 19 and the transmit/receive change-over switch 7 is turned to the receive side. Therefore, the output of the oscillator 18 does not reach the frequency dividers 20 and 21 and hence the frequency dividers 20 and 21 are inactive. Accordingly, the transmitter portion does not generate a carrier signal of 200 MHz which is the same as the transmission frequency.

What is essential to the present embodiment in the above operation lies in that the oscillator 18 of 800 MHz, which is higher than the transmission and reception frequencies, is provided, and the transmission frequency and the local oscillation frequency in the reception state are produced by the oscillator 18 and frequency dividers 20, 21 and 22 and 23 which have different division ratios. In the present embodiment, the frequencies generated in the equipment or transceiver in the reception state include only 266 MHz at the frequency divider 22 which is one third of 800 MHz and 133 MHz at the frequency divider 23 which is the local frequency, and the 200 MHz signal used for communication or a signal in the vicinity of 200 MHz are not generated.

Accordingly, the first embodiment can avoid the problems which were considered to be substantial in the conventional TDD transceiver. That is, the deterioration of reception sensitivity which results from the unceasing generation of a transmission frequency signal in the transceiver and the interference in other radio equipments which results from the leakage of the oscillator output at the transmission frequency or a frequency in the vicinity thereof to the exterior of the transceiver at the time other than the time of transmission. Also, there are advantages that the original oscillation at 800 MHz in the oscillator 18 is stably maintained and that a change-over between transmission and reception can be made in a short time since only the change-over of input to the frequency dividers 20, 21 and 22 and 23 by the change-over switch 19 and the change-over by the transmit/receive change-over switch 7 are required.

Figure 2:
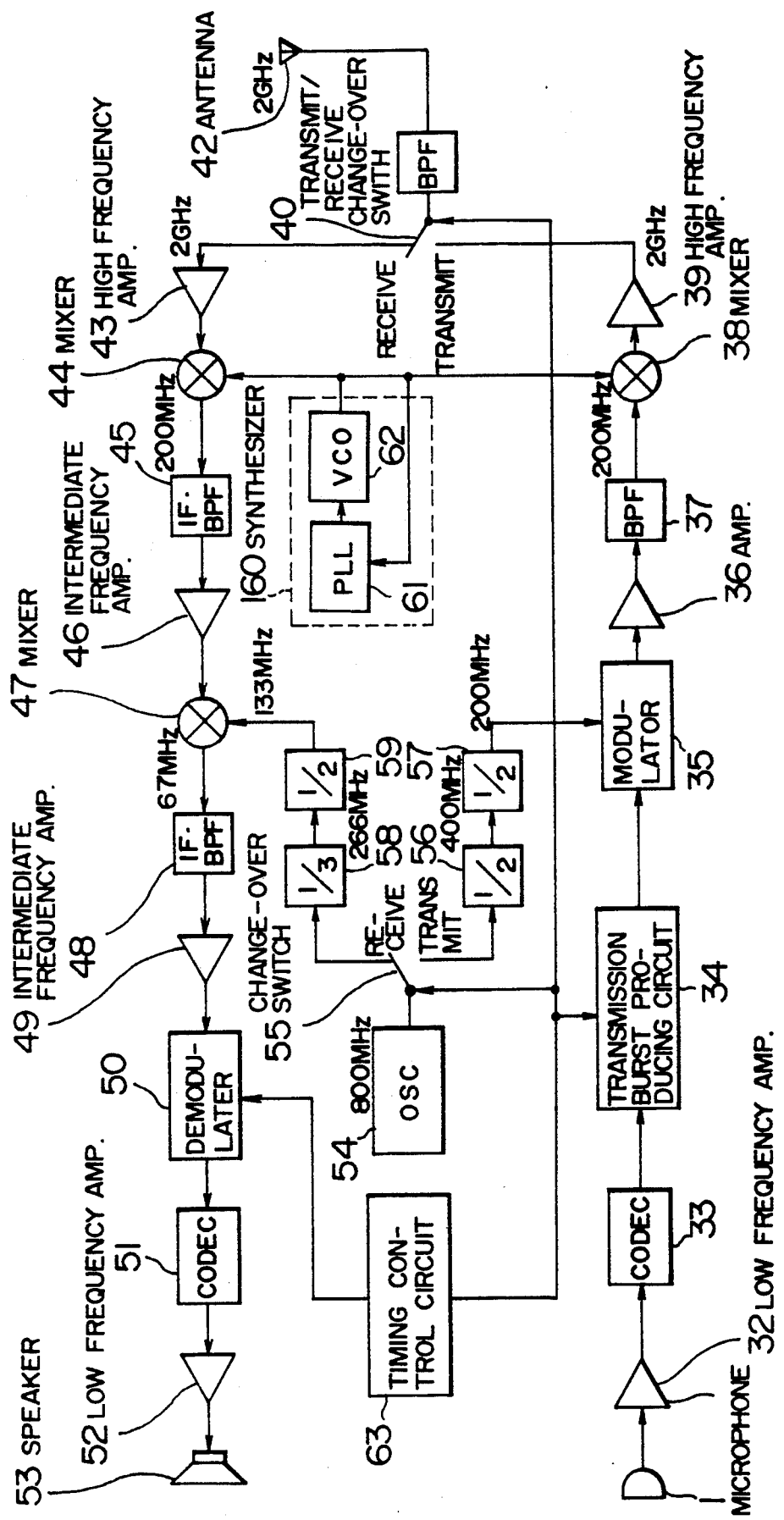
FIG. 2 is a block diagram of a radio transceiver according to a second embodiment of the present invention.

FIG. 2 shows the construction of a second embodiment of the present invention. In order to provide TDD communication in the 2 GHz band, which is a quasi-microwave band, the basic construction of the 200 MHz band TDD transceiver, shown in FIG. 1, is utilized with additional construction. In the additional construction of the present embodiment, a synthesizer for producing a 1.8 GHz signal to be mixed with the 200 MHz signal is used as a second oscillator. Thereby, it becomes possible to make a communication through a frequency change-over in a plurality of carrier frequencies allotted for the 2 GHz band. Namely, a transceiver or equipment according to the second embodiment provides an optimum equipment which realizes a so-called second-generation digital codeless telephone set.

In FIG. 2, reference numeral 31 designates a microphone, numeral 32 a low frequency amplifier, numeral 33 a CODEC, numeral 34 a transmission burst producing circuit, numeral 35 a modulator, numeral 36 an amplifier, numeral 37 a band pass filter (BPF), numeral 38 a mixer, numeral 39 a high frequency amplifier, numeral 40 a transmit/receive change-over switch, numeral 41 a band pass filter (BPF) and numeral 42 an antenna; and these components form a transmitter portion. On the other hand, reference numeral 43 designates a high frequency amplifier, numerals 44 and 47 mixers, numerals 45 and 48 intermediate frequency band filters (IF·BPF's), numerals 46 and 49 intermediate frequency amplifiers, numeral 50 a demodulator, numeral 51 a CODEC, numeral 52 a low frequency amplifier and numeral 53 a speaker; and these components form a receiver portion together with the transmit/receive change-over switch 40, the band pass filter 41 and the antenna 42. Also, reference numeral 54 designates a first oscillator of 800 MHz, numeral 55 a change-over switch, numerals 56 and 57 ½ frequency dividers, numeral 58 a ⅓ frequency divider, numeral 59 a ½ frequency divider, numeral 160 a synthesizer which is a second oscillator, numeral 61 a PLL (or a phase locked loop circuit), numeral 62 a VCO (voltage controlled oscillator) and numeral 63 a timing control circuit; and these components form a characterized part of the second embodiment. The synthesizer 160 generates a local oscillation signal of 1.8 GHz by PLL 61 and the VCO 62. The timing control circuit 63 controls the timing of the operation for the transmission burst producing circuit 34 and the demodulator 50 and also controls the timing of change-over for the transmit/receive change-over switch 40 and the change-over switch 55.

Next, explanation will be made of the operation of the second embodiment. An audio signal from the microphone 31 is amplified by the low frequency amplifier 32, is thereafter converted by the CODEC 33 into a digital signal and is then inputted through the transmission burst producing circuit 34 to the modulator 35.

Thereupon, an output of the oscillator 54 of 800 MHz, which is converted into 200 MHz by passing through two stages of the ½ frequency dividers 56 and 57 with the change-over switch 55 turned to the transmit side, is applied to the modulator 35 as a carrier signal to be emitted in the transmission state. A high frequency signal obtained by modulating this frequency of 200 MHz is amplified by the amplifier 36, is passed through the band pass filter 37 and is thereafter mixed by the mixer 38 with an output of 1.8 GHz from the synthesizer 160 to be converted into 2 GHz. Thereafter, the converted signal is amplified by the high frequency amplifier 39, is sent to the antenna 42 with the transmit/receive change-over switch 40 turned to the transmit side and is passed through the band pass filter 41 and is emitted as a radio wave from the antenna 42.

On the other hand, in the reception state, a signal in a 2 GHz band received by the antenna 42 is inputted to the mixer 44 through the band pass filter 41, with the transmit/receive change-over switch 40 turned to the receive side and through the high frequency amplifier 43. At the time of reception, a first intermediate frequency signal of 200 MHz is obtained from a first local oscillation signal generated by the synthesizer 160 and this signal is passed through the intermediate frequency band pass filter 45 and amplified by the intermediate frequency amplifier 46. Next, in a manner similar to that in the first embodiment, an output of the oscillator 54 of 800 MHz is passed through the change-over switch 55 and is frequency-divided by the ⅓ frequency divider 58 and the ½ frequency divider 59 into 1/6 to 133 MHz as a second local frequency signal for a superheterodyne. The second local signal is injected to the mixer 47 and frequency-converted into a second intermediate frequency signal of 67 Mhz. The resultant signal is passed through the intermediate band filter 48 and is amplified by the intermediate frequency amplifier 49. The amplified signal is sent through the demodulator 50 to the CODEC 51 and is converted into an audio signal. The audio signal is amplified by the low frequency amplifier 52 and is thereafter outputted from the speaker 53. During the above operation in the reception state, each of the change-over switch 55 and the transmit/receive change-over switch 40 is turned to the receive side. Therefore, the output of the oscillator 54 does not reach the frequency dividers 56 and 57 and therefore, the frequency dividers 56 and 57 are inactive. Accordingly, the transmitter portion does not generate the intermediate frequency signal of 200 MHz and the carrier at the transmission frequency of 2 GHz.

Thus, according to the second embodiment, the transmitter portion is constructed so as to mix an intermediate frequency of 200 MHz with the output of the 1.8 GHz synthesizer and the receiver portion is constructed as a double superheterodyne receiver which works at a first intermediate frequency of 200 MHz and a second intermediate frequency of 67 MHz. This construction provides an optimum equipment for realizing a so-called second-generation digital codeless telephone set which provides communication through a frequency change-over in a plurality of carrier frequencies alotted for 2 GHz.

As has been described above, according to the present invention, in order to generate a signal to be emitted in the transmission state or an intermediate frequency signal at a transmitter portion, there are provided an oscillator oscillating at a frequency higher than the frequency of the carrier to be emitted in the transmission state or the intermediate frequency at the transmitter portion and frequency divider means for frequency-dividing an output of the oscillator, and an operation of the frequency divider means is stopped or a change-over to another frequency divider means is made in the reception state, whereby the signal to be emitted in the transmission state or the intermediate frequency signal at the transmitter portion is prevented from being generated in a transceiver in the reception state. Thus, the deterioration of reception sensitivity and the interference in other communication equipments resulting from the generation of the carrier at the transmission or a frequency in the vicinity thereof in the conventional TDD transceiver in the reception state can be effectively avoided by relatively simple means. This is very advantageous in realizing a radio communication transceiver which satisfactorily exhibits the primary performance of a TDD system.

The present invention may also be provided with not only the above construction, but also a construction in which a receiver portion includes at least one stage of superheterodyne frequency converter and a local oscillation frequency signal for the superheterodyne frequency converter is generated by a second oscillator, thereby making it possible to provide a time-division duplex radio transceiver optimum for a so-called second-generation digital codeless telephone set which makes a communication through a frequency change-over in a plurality of carrier frequencies.

In the second embodiment, transmission/reception in various bands are made possible by changing the oscillation frequency of the synthesizer 160. For example, if the oscillation frequency is selected to be 600 MHz, the equipment can be used as a digital portable telephone set in a 800 MHz band. Also, if the oscillation frequency is selected to be 1.3 GHz, the equipment can be used as a digital portable telephone set in a 1.5 GHz band.

Figure 3:
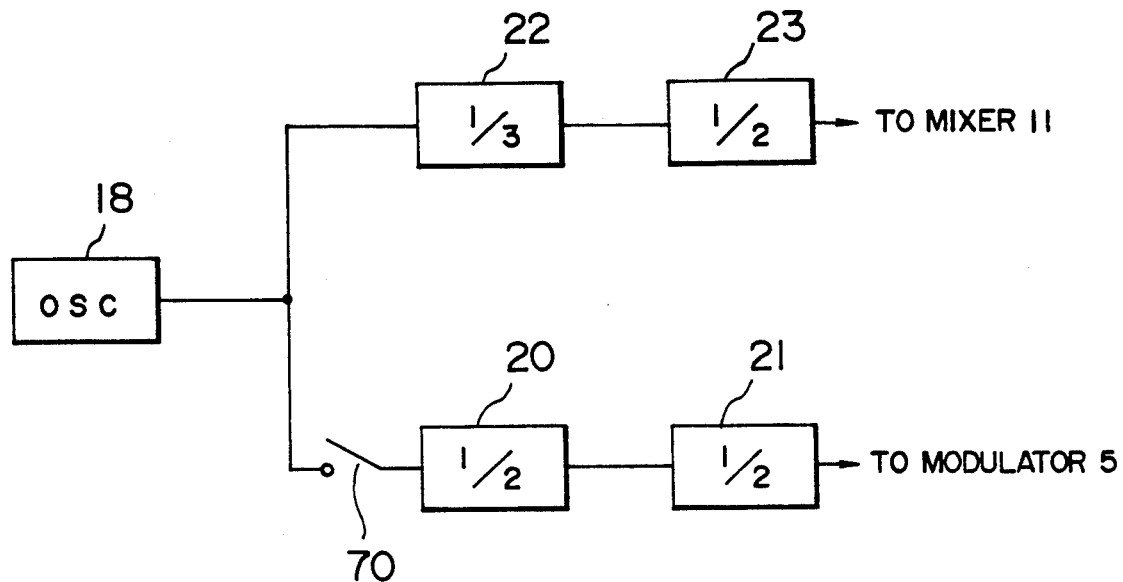
FIGS. 3 and 4 are block diagrams showing further different embodiments of an oscillator and frequency divider portion of the radio transceiver according to the present invention.

FIG. 3 shows another embodiment of the oscillator and frequency divider portion. In this embodiment, an oscillator 18 of 800 MHz is always connected to a ⅙ frequency divider 22 and a ½ frequency divider 23 on the receive side on one hand and through a switch 70 to ½ frequency dividers 20 and 21 on the other hand. Since the construction and operation of the other portion are the same as those in FIG. 1 or 2, the illustration and explanation thereof will be omitted.

In the transmission state, the switch 70 is closed so that a signal of 800 MHz generated from the oscillator 18 is frequency-divided by the ½ frequency dividers 20 and 21 to supply a carrier signal of 200 MHz to the modulator 5. During this time, the output of 800 MHz from the oscillator 18 is frequency-divided by the ⅙ frequency divider 22 and the ½ frequency divider 23 to supply a signal of 133 MHz to the mixer 11. However, since the transmit/receive change-over switch 7 or 40 is turned to the transmit side, no reception signal is received.

In the reception state, on the other hand, the switch is opened or cut off. Accordingly, the oscillator 18 is not connected to the ½ frequency dividers 20 and 21 and thus the ½ frequency dividers 20 and 21 stop their operations. Therefore, no carrier signal at the transmission frequency is generated in the transceiver. It is preferable that the change-over of the switch 70 is interlocked with that of the transmit/receive change-over switch 7 or 40.

Figure 4:
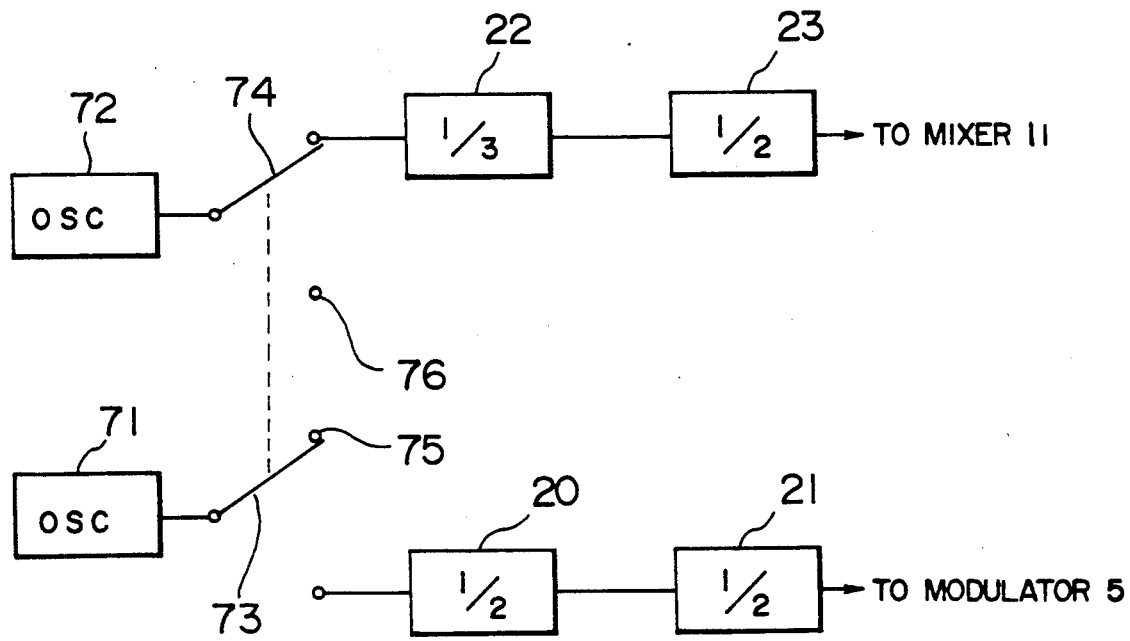

FIG. 4 shows a further embodiment of the oscillator and frequency divider portion. This embodiment has oscillators for the exclusive use of transmission and reception, respectively. In the transmission state, an oscillator 71 is connected to ½ frequency dividers 20 and 21 through a switch 73 to generate a transmission carrier signal. At this time, in the receiver portion, a switch 74 is connected to a terminal 76 so as to prevent an oscillator 72 from being connected to a ⅙ frequency divider 22 and a ½ frequency divider 23.

In the reception state, on the other hand, the oscillator 72 is connected to the ⅙ frequency divider 22 and the ½ frequency divider 23 through the switch 74 to generate a local oscillation wave. At this time, in the transmitter portion, the switch 73 is connected to a terminal 75 so as to stop the operation of the ½ frequency dividers 20 and 21. In this case, it is preferable that the switches 73 and 74 can be changed over in a manner interlocked with each other and in a manner interlocked with the transmit/receive change-over switch 7 or 40.

What is claimed is:

1. A radio transceiver including a transmitter portion for use in a transmission state of said transceiver and a receiver portion for use in a reception state of said transceiver, said transmitter portion emitting a transmission carrier signal of a predetermined frequency in said transmission state, said transceiver comprising:
   an oscillator which oscillates at a frequency higher than said predetermined frequency of said transmission carrier signal and generates an output;
   first frequency divider means, having a first division ratio, for frequency-dividing said output of said oscillator to generate said transmission carrier signal;
   second frequency divider means, having a second division ration different from said first division ratio, for frequency dividing said output of said oscillator to generate a signal used to generate a first intermediate signal in said receiver portion;
   switching means for selectively supplying said output of said oscillator between said first frequency divider means and said second frequency divider means; and
   timing control means, connected to said switching means, for controlling said switching means such that in said reception state said switching means supplies said second frequency divider means with said output of said oscillator, to thereby prohibit generation of said transmission carrier signal in said reception state.

2. A radio transceiver according to claim 1, wherein said receiver portion comprises a superheterodyne frequency converter having at least one stage, wherein said signal generated by said second frequency divider means is used as a local oscillation signal in said superheterodyne frequency converter to produce said first intermediate frequency in said receiver portion.

3. A radio transceiver including a transmitter portion for use in a transmission state of said transceiver and a receiver portion for use in a reception state of said transceiver, said transmitter portion producing an intermediate frequency signal to be mixed with another signal to generate a transmission carrier signal of a predetermined frequency, said transceiver comprising:
   an oscillator which oscillates at a frequency higher than a frequency of said intermediate frequency signal and generates an output;
   first frequency divider means, having a first division ratio, for frequency-dividing said output of said oscillator to generate said intermediate frequency signal;
   second frequency divider means, having a second division ration different from said first division ratio, for frequency dividing said output of said oscillator to generate a signal used to generate a first intermediate signal in said receiver portion;

switching means for selectively supplying said output of said oscillator between said first frequency divider means and said second frequency divider means; and timing control means, connected to said switching means, for controlling said switching means such that in said reception state said switching means supplies said second frequency divider means with said output of said oscillator, to thereby prohibit generation of said intermediate frequency signal in said reception state.

4. A radio transceiver according to claim 3, wherein said receiver portion comprises a superheterodyne frequency converter having at least one stage, wherein said signal generated by said second frequency divider means is used as a local oscillation signal in said superheterodyne frequency converter to produce said first intermediate frequency in said receiver portion.

5. A radio transceiver according to claim 3, further comprising a second oscillator for converting said intermediate frequency signal in said transmission portion into said transmission carrier signal, and for converting a reception signal into a second intermediate frequency signal of a frequency lower than said reception frequency in said reception portion.

6. A radio transceiver comprising:
signal generating means for generating a signal of a first frequency;
first frequency-dividing means for frequency-dividing the first frequency signal into a signal of a second frequency;
second frequency-dividing means for frequency-dividing the first frequency signal into a signal of a third frequency;
first change-over means for connecting said signal generating means selectively to said first frequency-dividing means and said second frequency-dividing means;
modulating means for modulating the second frequency signal by a signal to be transmitted;
antenna means for making transmission/reception of a signal;
mixing means for mixing a reception signal and the third frequency signal;
demodulating means for demodulating an output of said mixing means; and
second change-over means for connecting said antenna means selectively to said modulating means and said mixing means.

7. A radio transceiver according to claim 6, wherein a division ratio of said first frequency-dividing means is different from that of said second frequency-dividing means.

8. A radio transceiver according to claim 7, wherein the division ratio of said first frequency-dividing means is larger than that of said second frequency-dividing means.

9. A radio transceiver according to claim 6, wherein an operation of said first change-over means of connecting said signal generating means to said first frequency-dividing means and an operation of said second change-over means of connecting said antenna means to said modulating means are simultaneously performed, and an operation of said first change-over means of connecting said signal generating means to said second frequency-dividing means and an operation of said second change-over means of connecting said antenna means to said mixing means are simultaneously performed.

10. A radio transceiver comprising:
first signal generating means for generating a signal of a first frequency;
second signal generating means for generating a signal of a second frequency;
first frequency-dividing means for frequency-dividing the first frequency signal into a signal of a third frequency;
second frequency-dividing means for frequency-dividing the first frequency signal into a signal of a fourth frequency;
first change-over means for connecting said first signal generating means selectively to said first frequency-dividing means and said second frequency-dividing means;
modulating means for modulating the third frequency signal by a signal to be transmitted;
first mixing means for an output of said modulating means and the second frequency signal;
antenna means for making transmission/reception of a signal;
second mixing means for mixing a reception signal and the second frequency signal;
second change-over means for connecting said antenna means selectively to said first mixing means and said second mixing means;
third mixing means for mixing an output of said second mixing means and the fourth frequency signal; and
demodulating means for demodulating an output of said third mixing means.

11. A radio transceiver according to claim 10, wherein a division ratio of said first frequency-dividing means is different from that of said second frequency-dividing means.

12. A radio transceiver according to claim 10, wherein the division ratio of said first frequency-dividing means is larger than that of said second frequency-dividing means.

13. A radio transceiver according to claim 10, wherein said second frequency is higher than said third frequency.

14. A radio transceiver according to claim 10, wherein said second frequency is a frequency in a quasi-microwave band.

15. A radio transceiver according to claim 10, wherein said second change-over means connects said antenna means to said first mixing means when said first change-over means connects said first signal generating means to said first frequency-dividing means and to said second mixing means when said first change-over means connects said first signal generating means to said second frequency-dividing means.

16. A transceiver comprising:
signal generating means for always generating an output signal of a first frequency;
first frequency-dividing means for frequency-dividing said output signal of said signal generating means into a signal having a second frequency lower than said first frequency;
second frequency-dividing means for frequency-dividing the output signal of said signal generating means into a signal having a third frequency lower than said first frequency and different from said second frequency;
switching means for selectively supplying said output signal of said signal generating means between said first frequency-dividing means and said second frequency-dividing means; and timing control means, connected to said switching means, for controlling said switching means such that said first and second frequency-dividing means are alternately driven, wherein said signal of said second frequency is used as a transmission carrier signal, and said signal of said third frequency is used as a signal for frequency conversion of a reception signal.

17. A transceiver comprising:

first signal generating means for always generating an output signal of a first frequency;

first frequency-dividing means for frequency-dividing said output signal of said first signal generating means into a signal having a second frequency lower than said first frequency;

second frequency-dividing means for frequency-dividing the output signal of said first signal generating means into a signal of a third frequency lower than said first frequency and different from said second frequency;

second signal generating means for generating a signal of a fourth frequency higher than said second and third frequencies;

switching means for selectively supplying said output signal of said signal generating means between said first frequency-dividing means and said second frequency-dividing means; and timing control means, connected to said switching means, for controlling said switching means such that said first and second frequency-dividing means are alternately driven, wherein said signal of said second frequency is used as a transmitter intermediate signal to be modulated by a transmission signal, said signal of said fourth frequency is used as a local oscillation signal for frequency-converting a modulating wave and a local oscillation frequency for converting a reception signal into a first intermediate frequency, and said signal of said third frequency is used as a local oscillation signal by which the reception signal converted into said first intermediate frequency is converted into a second intermediate frequency.

18. A transceiver comprising:

signal generating means for always generating a signal of a first frequency;

first frequency-dividing means for frequency-dividing an output of said signal generating means into a signal of a second frequency lower than said first frequency; and second frequency-dividing means for frequency-dividing the output of said signal generating means into a signal of a third frequency lower than said first frequency and different from said second frequency, wherein said first frequency-dividing means being selectively connected to said signal generating means, said second frequency-dividing means being always connected to said signal generating means, said signal of said second frequency being used as a signal to be modulated by a transmission signal, and said signal of said third frequency being used as a signal for frequency conversion of a reception signal.

19. A transceiver comprising:

signal generating means for always generating an output signal of a first frequency;

first frequency-dividing means for frequency-dividing said output signal of said signal generating means into a signal of a second frequency lower than said first frequency;

second frequency-dividing means for frequency-dividing the output signal of said signal generating means into a signal of a third frequency lower than said first frequency and different from said second frequency; and second signal generating means for generating a signal of a fourth frequency higher than said second and third frequencies, said first frequency-dividing means being selectively connected to said signal generating means, said second frequency-dividing means being always connected to said signal generating means, the signal of said second frequency being used as a signal to be modulated by a transmission signal, and the signal of said third frequency being used as a signal for frequency conversion of a reception signal, the signal of said fourth frequency being used as a local oscillation frequency for frequency-converting a modulating signal and a local oscillation frequency for converting a reception signal into an intermediate frequency.

20. A transceiver comprising:

first signal generating means for generating always a signal of a first frequency;

first change-over means for connecting said first signal generating means selectively to first frequency-dividing means;

second signal generating means for generating always a signal of a second frequency; and second change-over means for connecting said second signal generating means selectively to second frequency-dividing means, wherein said second change-over means disconnecting said second signal generating means and said second frequency-dividing means when said first change-over means connects said first signal generating means and said first frequency-dividing means, said first change-over means disconnecting said first signal generating means and said first frequency-dividing means when said second change-over means connects said second signal generating means and said second frequency-dividing means, and output of said first frequency-dividing means being used as a signal to be modulated by a transmission signal, and an output of said second frequency-dividing means being used as a signal for frequency conversion of a reception signal.

21. A transceiver comprising:

first signal generating means for always generating an output signal of a first frequency;

first frequency dividing means;

first change-over means for connecting said first signal generating means selectively to said first frequency-dividing means;

second signal generating means for always generating an output signal of a second frequency;

second frequency dividing means;

second change-over means for connecting said second signal generating means selectively to said second frequency-dividing means;

third signal generating means for generating an output signal of a frequency higher than output frequencies from said first and second frequency-dividing means, said second change-over means disconnecting said second signal generating means and said second frequency-dividing means when said first change-over means connects said first signal generating means and said first frequency-dividing means, said first change-over means disconnecting said first signal generating means and said first frequency-dividing means when said second change-over means connects said second signal generating means and said second frequency-dividing means, an output of said first frequency-dividing means being used as a signal to be modulated by a transmission signal, and an output of said second frequency-dividing means being used as a signal for frequency conversion of a reception signal, an output of said third signal generating means being used as a local oscillation wave for frequency-converting a modulating signal and a local oscillation wave for converting the reception signal into an intermediate frequency.

* * * * *